United States Patent
Baumgartner et al.

(10) Patent No.: US 9,377,072 B2
(45) Date of Patent: Jun. 28, 2016

(54) WET-RUNNING MULTI-DISC BRAKE

(75) Inventors: Johann Baumgartner, Moosburg (DE);
Aleksandar Pericevic, Munich (DE);
Robert Gruber, Pfaffing (DE); Steffen Geissler, Rodgau (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 113 days.

(21) Appl. No.: 13/236,058

(22) Filed: Sep. 19, 2011

(65) Prior Publication Data

US 2012/0037463 A1 Feb. 16, 2012

Related U.S. Application Data

(63) Continuation of application No. PCT/EP2010/001739, filed on Mar. 19, 2010.

(30) Foreign Application Priority Data

Mar. 19, 2009 (DE) .......... 10 2009 013 894

(51) Int. Cl.
*F16D 55/46* (2006.01)
*F16D 65/18* (2006.01)
*F16D 55/38* (2006.01)
(Continued)

(52) U.S. Cl.
CPC .............. *F16D 65/186* (2013.01); *F16D 55/38* (2013.01); *F16D 2121/02* (2013.01); *F16D 2121/14* (2013.01); *F16D 2125/36* (2013.01); *F16D 2127/10* (2013.01)

(58) Field of Classification Search
CPC . F16D 2125/36; F16D 2125/38; F16D 55/36; F16D 65/18; F16D 65/186

USPC .......... 188/70 R, 70 B, 71.1–71.5, 72.2, 72.7, 188/72.8
See application file for complete search history.

(56) References Cited

U.S. PATENT DOCUMENTS 1,718,216 A  6/1929 Cassel
1,943,795 A  1/1934 Harman
(Continued)

FOREIGN PATENT DOCUMENTS

DE  410373 A  3/1925
EP  0 530 155 B1  11/1995
GB  2 034 834 A  6/1980

OTHER PUBLICATIONS

German Office Action dated Dec. 3, 2009 with English translation (six (6) pages).
(Continued)

*Primary Examiner* — Vishal Sahni
(74) *Attorney, Agent, or Firm* — Crowell & Moring LLP

(57) ABSTRACT

A wet-running multi-disc brake includes stator discs, which are arranged in parallel to and at a distance from each other in a rotationally fixed manner, and a rotatable rotor disc positioned in each case between the stator discs. The radially extending stator discs and rotor discs can be pressed against one another during braking by way of a brake application device while overcoming a clearance. The wet-running multi-disc brake is designed such that the brake application device can be mechanically actuated and, via an actuating unit, engages a self-energizing device, which includes a pressure ring that can be pressed towards the rotor discs during braking independently from the rotational direction of the rotor discs.

18 Claims, 2 Drawing Sheets

(51) Int. Cl.
  *F16D 121/02* (2012.01)
  *F16D 121/14* (2012.01)
  *F16D 125/36* (2012.01)
  *F16D 127/10* (2012.01)

(56) References Cited

U.S. PATENT DOCUMENTS

| | | | | |
|---|---|---|---|---|
| 2,778,452 | A | * | 1/1957 | Dasse ............................ 188/71.5 |
| 2,916,105 | A | * | 12/1959 | Dasse et al. ................... 188/71.5 |
| 2,928,504 | A | * | 3/1960 | Hahn et al. .................... 188/71.5 |
| 2,938,607 | A | | 5/1960 | Kershner et al. |
| 3,382,952 | A | | 5/1968 | Grattapaglia |
| 4,128,145 | A | * | 12/1978 | Euler ............................ 188/71.2 |
| 4,159,754 | A | * | 7/1979 | Airheart et al. ............... 188/71.8 |
| 4,458,789 | A | * | 7/1984 | Cole ............................ 188/71.5 |
| 5,390,986 | A | | 2/1995 | Hall, III |
| 6,318,511 | B1 | * | 11/2001 | Clement et al. ............. 188/71.6 |
| 6,971,484 | B2 | * | 12/2005 | Sekiguchi .................... 188/72.7 |

OTHER PUBLICATIONS

International Search Report dated Jun. 17, 2010 with English translation (four (4) pages).
International Preliminary Report on Patentability dated Sep. 29, 2011 (Six (6) pages).

* cited by examiner

WET-RUNNING MULTI-DISC BRAKE

CROSS-REFERENCE TO RELATED APPLICATIONS

This application is a continuation of PCT International Application No. PCT/EP2010/001739, filed Mar. 19, 2010, which claims priority under 35 U.S.C. §119 from German Patent Application No. DE 10 2009 013 894.3, filed Mar. 19, 2009, the entire disclosures of which are herein expressly incorporated by reference.

BACKGROUND AND SUMMARY OF THE INVENTION

The invention relates to a wet-running multi-disc brake having stator discs which are arranged in parallel and at a spacing from one another. The stator discs are held in a rotationally fixed manner. Between the stator discs in each case, one rotatable rotor disc is positioned. During a braking operation, the radially extending stator discs and rotor discs are pressable against one another by way of a brake application device while overcoming a clearance gap.

In comparison with dry-running brakes, for example disc brakes, as have been used up to now predominantly in road vehicles, in particular in heavy commercial vehicles such as road trucks and buses, wet-running multi-disc brakes afford advantages in relation to robustness, service life of the brake pads and environmental pollution.

Conventional dry-running friction brakes are subject to relatively high wear and produce brake abrasion, which contributes to a not inconsiderable amount of dust pollution, in particular fine dust pollution of the environment.

Moreover, the brake pad wear requires corresponding maintenance work which causes additional operating costs.

In contrast, wet-running multi-disc brakes have been used up to now principally in special trucks, heavy construction vehicles, tractors or the like; said wet-running multi-disc brakes are subject to very low wear and are operated at a low temperature level.

The wet-running brakes are usually actuated hydraulically, while dry-running multi-disc brakes which are likewise used, for example, in said special trucks, are actuated, for example, pneumatically or mechanically.

In order to reduce the actuating force, self-energizing devices are provided in such dry-running multi-disc brakes, which self-energizing devices have an actuating ring with ramps which extend on one side in the rotational direction of the rotor discs. Via the actuating ring, firstly the brake application force is transmitted and, secondly, a self-energizing effect is generated.

However, the self-energizing brake application device has to be actuated in a manner which is dependent on the rotational direction, which would be possible in the case of compressed air actuation, for example, by use of two actuating cylinders or a switchover gear mechanism and a rotational direction detection device (and a correspondingly complicated controller). However, a design of this type is not readily suitable for large volume mainly for cost reasons.

Moreover, considerable problems also arise during operation in the case of use in a road vehicle, for example if the corresponding vehicle is braked during an ascent.

Here, the service brake operation takes place until the vehicle reaches a standstill in the forward driving direction. However, the subsequent holding action has to be applied in the backward driving direction in accordance with the direction of the slope effect. As a consequence, this means a greatly reduced braking and holding action in the backward driving direction or, if the ramps are formed in both driving directions, a temporarily unbraked state of the vehicle in the case of a change from the forward to the backward braking direction.

The known mechanical ramp actuating systems do not meet the many requirements of modern commercial vehicle brake systems which, moreover, are known only as dry-running multi-disc brakes, but not as wet-running multi-disc brakes.

The invention is based upon developing further a wet-running multi-disc brake such that its capability to be used is improved, and that it can be used, in particular, in road vehicles.

According to the invention, a wet-running multi-disc brake is provided having stator discs which are arranged in parallel and at a spacing from one another. The stator discs are held in a rotationally fixed manner. Between the stator discs in each case, one rotatable rotor disc is positioned. During a braking operation, the radially extending stator discs and rotor discs are pressable against one another by way of a brake application device while overcoming a clearance gap. The brake application device is actuatable mechanically and acts via an actuating unit on a self-energizing device which has a thrust ring which, during a braking operation, is pressable toward the rotor discs independently of the rotational direction of the rotor discs.

The brake application device can therefore be actuated mechanically for the first time with simultaneous self-energizing, to be precise in both rotational directions of the rotor discs.

First of all, the invention is distinguished by its extremely simple and therefore robust design, since additional measures can be dispensed with, such as the two actuating cylinders already mentioned with respect to the prior art in a pneumatically actuable brake application device or a rotational direction detection means and an associated controller.

The advantages of a mechanically actuable brake application device can therefore be utilized in a wet-running multi-disc brake, without restrictions on the braking behavior during backward driving.

As a result of the self-energizing device, a high application force can be achieved with a low requirement of actuating energy which, as has been shown, is merely from 30 to 50% of the requirement of a conventional brake actuation mechanism.

This leads to a reduction in the necessary frictional contacts and therefore to a reduction in the overall length of the entire brake and minimization of the dimensions of the actuating components such as the brake cylinder, accumulator spring, etc. This facilitates substantial assembly ease in the very constricted installation conditions, in particular in the case of an installation in the region of the front axle.

The actuating unit has an actuating ring which can preferably be adjusted axially via an integrally formed ramp during actuation of the brake application device, that is to say, of an actuator. Here, the ramp is oriented on one side in a rotational direction of the rotor discs, in accordance with the actuating direction of the actuator.

In contrast, the separate thrust ring has two ramp pairs which are oriented in opposite directions in both rotational directions of the rotor discs and correspond with a rolling body which is held in a brake housing such that it can roll but is stationary.

In the region of its respective ramp, the actuating ring is likewise supported on a rolling body which is mounted in a depression of the brake housing.

The parallel connection realized in this way of actuation firstly and self-energizing secondly makes an automatic rotational direction adaptation of the self-energizing without braking force interruption and mutually independent dimensioning of the actuating and energizing ramps possible. The actuating ring and the thrust ring are arranged parallel to one another and lie on one another in a manner which is supported by antifriction bearings.

The actuating ring can therefore introduce its brake application movement and therefore the loading force generated in the case of a braking operation into the thrust ring independently of a rotational movement of the latter.

The thrust ring is provided with a friction face which, in the case of a brake application operation, is pressed by way of the actuating ring against an associated rotor disc which forms a brake disc.

Here, a restoring force which acts before the brake disc assembly and the multi-disc assembly are pressed together and, therefore, before a build up of loading force, and which is generated by restoring springs which are arranged between the stator discs and the thrust ring, is sufficient to generate a frictional force which acts in the circumferential direction on the thrust ring and rotates the thrust ring so far that its ramps are activated in the correct rotational direction.

In the case of a further actuation of the brake, the build up of loading force then takes place. The force which is generated by the ramps of the actuating ring firstly and of the thrust ring secondly acts on the brake disc/multi-disc assembly in a manner which is combined in the thrust ring and as an overall loading force.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
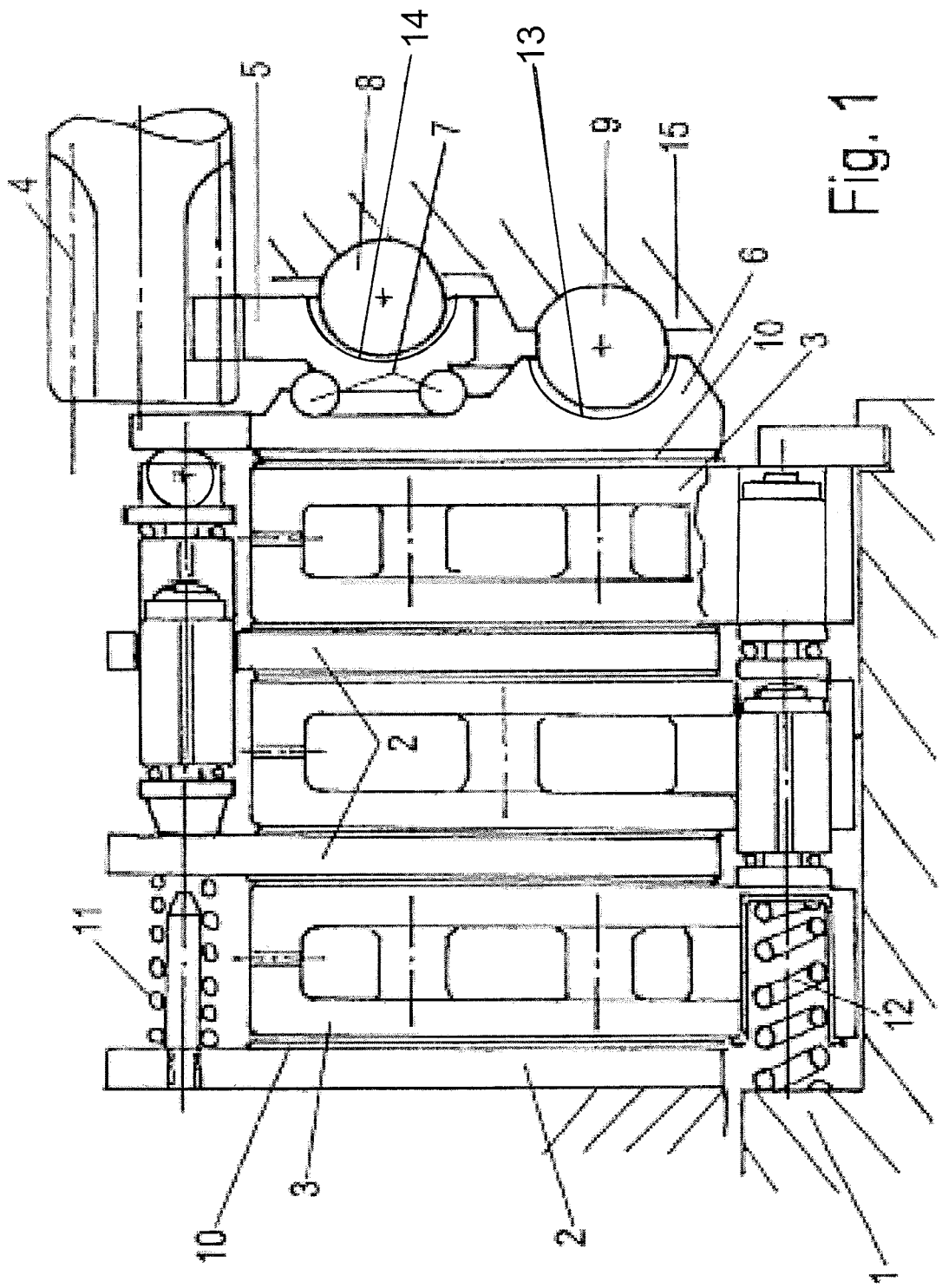
FIG. 1 is a diagrammatic illustration, in partial detail, of an exemplary multi-disc brake according to the invention.

FIG. 1 diagrammatically shows one half of a wet-running multi-disc brake according to an exemplary embodiment of the invention. The wet-running multi-disc brake has stator discs 2 which are arranged in parallel and at a spacing from one another. The stator discs 2 are held in a rotationally fixed manner, and between which in each case one rotatable rotor disc 3, which is configured in the manner of an internally ventilated brake disc, is positioned. During a braking operation, the radially extending stator discs 2 and rotor discs 3 are pressed against one another by way of a brake application device, of which a drive pinion 4 is shown, while overcoming a clearance gap (air play).

The rotor discs 3 are fastened on an axle 1 of a vehicle and are spring-loaded axially by means of restoring springs 12. Further restoring springs, which are provided with the designation 11, are likewise provided between the stator discs 2.

An actuating ring 5 is in engagement with the drive pinion 4. The actuating ring 5 is supported by way of a rolling body 8 on a brake housing 15 and has a ramp 14 (FIG. 3) in the region which is assigned to the rolling body 8. The ramp 14 rises counter to the rotational direction of the drive pinion 4 and therefore of the actuating ring 5.

During actuation of the brake application device, the actuating ring 5 is rotated via the drive pinion 4, being displaced axially in the direction of the rotor discs 2 by the ramp rise in interaction with the rolling body 8, which lies in a spherical cap of the brake housing 15.

A thrust ring 6 is positioned between a facing rotor disc 3 and the actuating ring 5. The thrust ring 6 is provided with a friction face 10 on the side facing the rotor disc 3, while it bears against the actuating ring 5 on the opposite side via an antifriction bearing 7, which is configured as an axial bearing.

On the actuating ring side, the thrust ring 6 is supported on a rolling body 9, which likewise lies in the brake housing 15. Ramp pairs, which are oriented in opposite directions in both rotational directions of the rotor discs 3, are provided in the contact region of the rolling body 9.

Independently of the rotational direction of the axle 1 and therefore of the rotor discs 3, in accordance with forward or backward driving, the thrust ring 6 comes into action as a self-energizing device, while the actuating ring 5 rotates merely in one direction. In the case of contact of the thrust ring 6 or its friction face 10 with the associated rotor disc 3 via the pressing by the actuating ring 5, the thrust ring 6 is co-rotated in accordance with the rotational direction of the rotor disc 3 and is pressed against the rotor disc 3 by the respective ramp 13 (FIG. 2).

Figure 2:
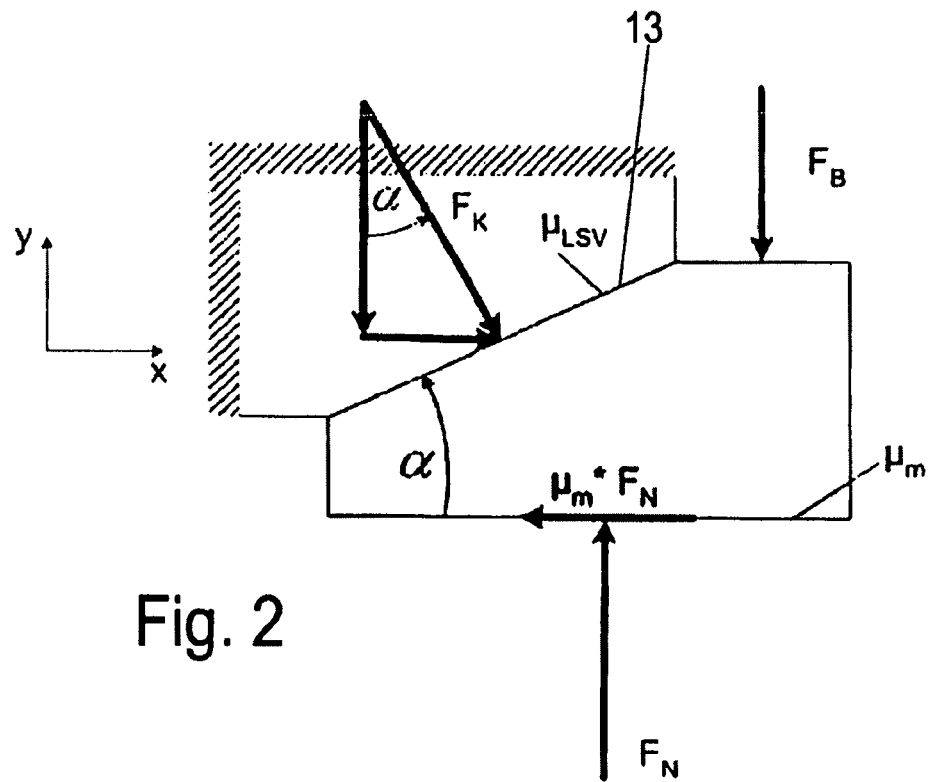
FIG. 2 is a force diagram of the force conditions on a ramp of the thrust ring.
Figure 3:
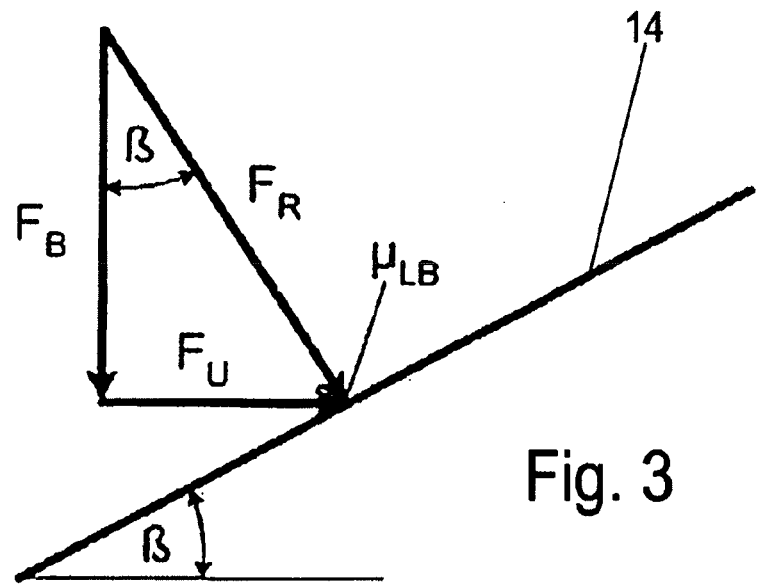
FIG. 3 is a force diagram of the force conditions on a ramp of the actuating ring.

With reference to FIGS. 2 and 3, one exemplary design of the described multi-disc brake is explained in the following text.

| Designation | Abbreviation | Value | Unit |
| --- | --- | --- | --- |
| Required braking moment | $M_{Br}$ | 23 000 | Nm |
| Mean friction radius | $r_m$ | 167 | mm |
| Number of frictional contacts | z | 6 | — |
| Mean coefficient of friction between lining discs and brake discs | $\mu_m$ | 0.125 | — |
| Wedge angle | α | 11.4 | ° |
| Actuating radius of the wedge system | $r_{SV}$ | 150 | mm |
| Bearing friction in self-energizing ramp | $\mu_{LSV}$ | 0.05 | — |
| Resulting friction angle of the self-energizing ramp | Y | 2.86 | ° |
| Ramp angle of the actuating ring | β | 5 | ° |
| Effective radius of the actuating ring | $r_B$ | 167 | mm |
| Bearing friction in actuating ramp | $\mu_{LB}$ | 0.05 | — |
| Resulting friction angle of the actuating ramp | δ | 2.86 | ° |
| Percentaged brake application force loss as a result of disc and multi-disc guidance | F % | 5 | % |
| Degree of efficiency of the spur gear stage | η | 97 | % |
| Pitch circle, actuating ramp | $r_{W2}$ | 180 | mm |
| Pitch circle, drive pinion | $r_{W1}$ | 27 | mm |

The necessary brake application force $F_N$ can be determined from the required braking moment:

$$F_N^* = \frac{M_{Br}}{\mu_m \cdot r_m \cdot z} = \frac{23000 \cdot Nm}{0.125 \cdot 0.167 \cdot m \cdot 6} = 183633 \cdot N$$

If one takes the percentage of brake application force loss into consideration, which is caused by friction in the disc and multi-disc guidance (axial displacement), the brake application force results as:

$$F_N = F_N^* \cdot (1 + F\%) = 183633 \cdot N \cdot 1.05 = 192814 \cdot N$$

The required brake application force $F_B$ of the actuating ramp can be calculated from this:

$$F_B = F_N \cdot \left(1 - \frac{\mu_m}{\tan(\alpha + \gamma)}\right)$$
$$= 192814 \cdot N \cdot \left(1 - \frac{0.125}{\tan(11.4° + 2.86°)}\right)$$
$$= 97983 \cdot N$$

In order for it to be possible for this force to be supported on the actuating ramp, a circumferential force of $F_U = F_B \cdot \tan(\beta + \delta) = 97983 \cdot N \cdot \tan(5° + 2.86°) = 13527 \cdot N$ is required.

The circumferential force on the toothing system is calculated as follows:

$$F_{RW2} = F_{RW1}$$
$$= F_U \cdot \frac{r_B}{r_{w2}}$$
$$= 13527 \cdot N \cdot \frac{0.150 \cdot m}{0.180 \cdot m}$$
$$= 11273 \cdot N$$

Finally, taking the degree of efficiency of the spur gear stage into consideration, the required actuating moment can be calculated:

$$M_{RW} = \frac{F_{RW1} \cdot r_{W1}}{\eta}$$
$$= \frac{11273 \cdot N \cdot 0.027 \cdot m}{0.97}$$
$$= 314 \cdot N \cdot m$$

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wet-running multi-disc self-energizing brake, comprising:
   a plurality of stator discs arranged in parallel and spaced from one another, the plurality of stator discs being held in a rotationally fixed manner;
   one or more rotatable rotor discs, one rotor disc being positioned between each of two adjacent stator discs;
   a brake application device that presses the plurality of stator discs and the one or more rotatable rotor discs, which extend radially, against one another during braking; and
   restoring springs operatively arranged between the one or more rotatable rotor discs, wherein
      the brake application device is mechanically actuatable and acts, via an actuating unit, on a self-energizing device, the self-energizing device comprising a thrust ring which, during braking of the wet-running multi-disc brake, is pressable toward the one or more rotatable rotor discs independently of a rotational direction of the one or more rotatable rotor discs,
      the actuating unit comprises an actuating ring that is axially displaceable and that has ramps, the ramps of the actuating unit actuating the brake only in a single rotational direction, irrespective of the rotational direction of the one or more rotatable rotor discs, the actuating ring rotating in only one rotational direction of the one or more rotatable rotor discs, and
      the thrust ring rotates in both rotational directions of the one or more rotatable rotor discs.

2. The wet-running multi-disc self-energizing brake according to claim 1, wherein the ramps of the actuating unit activate the self-energizing device in the single rotational direction.

3. The wet-running multi-disc self-energizing brake according to claim 1, further comprising:
   a brake housing on which the thrust ring and the actuating ring are supported in each case via rolling bodies; and
   wherein each respective rolling body rolls only on a single ramp or ramp pair that is located on a single side of each respective rolling body.

4. The wet-running multi-disc self-energizing brake according to claim 1, wherein the thrust ring comprises a frictional face on a side facing the one or more rotatable rotor discs.

5. The wet-running multi-disc self-energizing brake according to claim 3, wherein the thrust ring comprises a frictional face on a side facing the one or more rotatable rotor discs.

6. The wet-running multi-disc self-energizing brake according to claim 1, wherein the thrust ring is supported on the actuating ring by way of an antifriction bearing.

7. The wet-running multi-disc self-energizing brake according to claim 5, wherein the thrust ring is supported on the actuating ring by way of an antifriction bearing.

8. The wet-running multi-disc self-energizing brake according to claim 6, wherein the antifriction bearing is an axial bearing.

9. The wet-running multi-disc self-energizing brake according to claim 7, wherein the antifriction bearing is an axial bearing.

10. The wet-running multi-disc self-energizing brake according to claim 1, wherein the actuating ring comprises a spur tooth system, the spur tooth system meshing with a toothing system of a drive pinion of the brake application device.

11. The wet-running multi-disc self-energizing brake according to claim 9, wherein the actuating ring comprises a spur tooth system, the spur tooth system meshing with a toothing system of a drive pinion of the brake application device.

12. The wet-running multi-disc self-energizing brake according to claim 1, wherein the brake application device is pneumatically actuated.

13. The wet-running multi-disc self-energizing brake according to claim 1, wherein the restoring springs are operatively arranged between the plurality of stator discs on one side of the thrust ring.

14. The wet-running multi-disc self-energizing brake according to claim 1, further comprising additional restoring springs operatively arranged between the plurality of stator discs on one side of the thrust ring.

15. The wet-running multi-disc self-energizing brake according to claim 1, further comprising additional restoring springs operatively arranged between the plurality of stator discs on one side of the thrust ring.

16. The wet-running multi-disc self-energizing brake according to claim 14, further comprising:
two antifriction bearings, wherein
the restoring springs are arranged on an axle of a vehicle separately from the additional restoring springs,
the thrust ring is supported on the actuating ring by one of the two antifriction bearings, and
the actuating ring comprises a external spur tooth system, the external spur tooth system meshing with a toothing system of a drive pinion of the brake application device.

17. A wet-running multi-disc self-energizing brake, comprising:
a plurality of stator discs arranged in parallel and spaced from one another, the plurality of stator discs being held in a rotationally fixed manner;
one or more rotatable rotor discs, one rotor disc being positioned between each of two adjacent stator discs;
a brake application device that presses the plurality of stator discs and the one or more rotatable rotor discs, which extend radially, against one another during braking; and
restoring springs operatively arranged between the one or more rotatable rotor discs, wherein
the brake application device is mechanically actuatable and acts, via an actuating unit, on a self-energizing device that comprises a thrust ring which, during braking of the wet-running multi-disc brake, is pressable toward the one or more rotatable rotor discs independently of a rotational direction of the one or more rotatable rotor discs,
the actuating unit comprises an actuating ring that is axially displaceable and that has ramps, each ramp rising from a surface of the actuating unit toward the one or more rotatable rotor discs along only a first of two rotational directions of the one or more rotatable rotor discs, the ramps of the actuating unit actuating the brake only in a single rotational direction, irrespective of the rotational direction of the one or more rotatable rotor discs, the actuating ring rotating in only one rotational direction of the one or more rotatable rotor discs, and
the thrust ring has ramp pairs, each ramp pair rising from a surface of the thrust ring toward the one or more rotatable rotor discs from a common central ramp tail region with a first ramp of each ramp pair rising in the first of two rotational directions and a second ramp of each ramp pair rising in the second of two rotational directions, opposite the first of two rotational directions of the one or more rotatable rotor discs.

18. The wet-running multi-disc self-energizing brake according to claim 17, wherein the ramps of the actuating unit activate the self-energizing device in the single rotational direction.

* * * * *